O. G. Brady.
Shirt Bosom.
N° 44781  Patented Oct. 25, 1864

Witnesses  Inventor

UNITED STATES PATENT OFFICE.

O. G. BRADY, OF NEW YORK, N. Y.

IMPROVEMENT IN METAL SHIRT-BOSOMS.

Specification forming part of Letters Patent No. 44,781, dated October 25, 1864.

*To all whom it may concern:*

Be it known that I, O. G. BRADY, of the city, county, and State of New York, have invented a new and useful Improvement in Shirt-Bosoms; and I do hereby declare that the following is a full, clear, and exact description thereof, which will enable others skilled in the art to make and use the same, reference being had to the accompanying drawings, forming part of this specification, in which—

Figure 1:
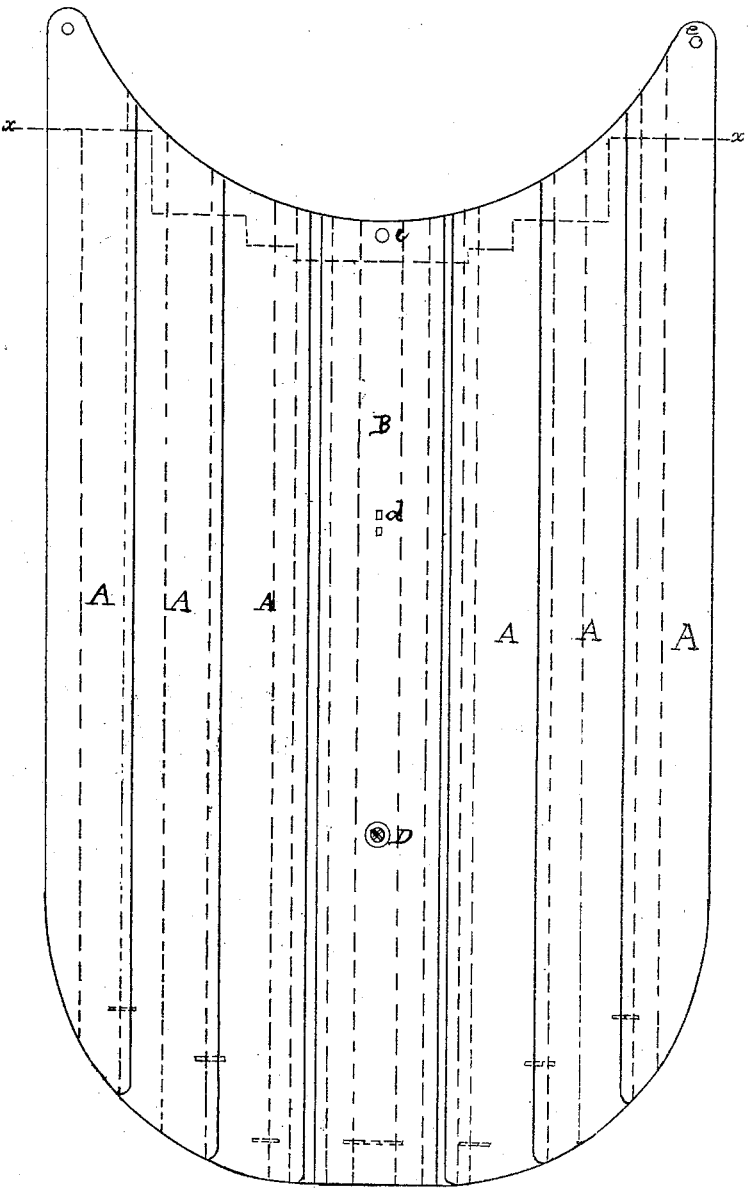
Figure 2:

Figure 1 is a representation of a metallic shirt-bosom; Fig. 2, a sectional view taken on the red line in Fig. 1.

Similar letters of reference indicate like parts.

The object of my invention is to produce a shirt-bosom which shall not be liable to the accidents that befall such as are made of linen or like material, which can, when soiled, be easily made presentable again, and which shall be durable, light, and cheap, and which may be prepared so as to resemble in appearance any fabric usually worn or which may be adopted for shirt bosoms.

I construct the bosoms of leaves A of thin sheet metal, of the configuration shown, and attach the leaves to each other by means of hooks C, soldered or otherwise secured to the inner faces of the leaves at or near the center of their width, both at the top and bottom of the bosom, as shown in Fig. 2, and also in Fig. 1 in dotted outline at the bottom of the bosom. These hooks take into holes in the edges of each adjacent leaf, so that when the leaves are hooked together they will partly overlie each other, as clearly shown in Fig. 2.

The central leaf of the bosom may be broader than the others, and in this example of my invention has two hooks, C, so as to secure it to adjacent leaves on each side of it, which are thus made to overlie it, as seen in the sectional view. By means of the central leaf I make a closer imitation of the usual linen shirt-bosoms as now worn. The central leaf is to be perforated with holes $d$, so as to allow buttons or studs or a breast-pin to be secured to it. Holes $e$ are made in the top of the bosom at such points as will enable the wearer to conveniently secure it to his person. The leaves are to be of thin metal so as to be easily shaped in the proper form, and the upper ends of the outer leaves are to be of increasing length, as shown in Fig. 1, so as to allow the bosom to conform to the symmetry of the chest, and neck, and shoulders of the human form.

The leaves of the bosom are to be enameled or otherwise coated or painted in a tasteful manner, so as to resemble a shirt-bosom of textile material, and their inner faces are also to be prepared or coated with any suitable preparation, so as to preserve the metal from corrosion and to make it tasteful in appearance.

Having thus described my invention, I claim as new and desire to secure by Letters Patent—

A shirt-bosom of metal, constructed substantially as above described.

O. G. BRADY.

Witnesses:
 ROBT. CURRIE,
 J. P. HALL.